United States Patent [19]

Anhegger

[11] 4,300,699
[45] Nov. 17, 1981

[54] FUEL TANK FOR MOTOR VEHICLES

[75] Inventor: Sigmund Anhegger, Renningen, Fed. Rep. of Germany

[73] Assignee: Dr. Ing. h.c.F. Porsche AG, Stuttgart, Fed. Rep. of Germany

[21] Appl. No.: 148,048

[22] Filed: May 8, 1980

[30] Foreign Application Priority Data

Jun. 6, 1979 [DE] Fed. Rep. of Germany ....... 2922876

[51] Int. Cl.³ .................... B65B 3/04; B65D 25/02
[52] U.S. Cl. ................... 220/86 R; 137/588; 141/392
[58] Field of Search ............ 220/86 R; 141/292, 392; 137/588

[56] References Cited

U.S. PATENT DOCUMENTS

| | | | |
|---|---|---|---|
| 3,730,216 | 5/1973 | Arnett et al. | 220/86 R X |
| 3,872,900 | 3/1975 | Götz | 220/86 R X |
| 3,880,317 | 4/1975 | Arnett | 220/86 R |
| 3,903,942 | 9/1975 | Vest | 220/86 R X |
| 3,911,977 | 10/1975 | Berger | 220/86 R X |
| 3,979,010 | 9/1976 | Fiedler et al. | 220/86 R |
| 4,157,104 | 6/1979 | Lofquist | 220/86 R X |
| 4,171,750 | 10/1979 | Hundemer | 220/86 R |
| 4,185,844 | 1/1980 | Hubbard et al. | 220/86 R |

*Primary Examiner*—Allan N. Shoap
*Attorney, Agent, or Firm*—Craig and Antonelli

[57] ABSTRACT

A fuel tank for motor vehicles of the type having a filler neck, a fuel tank vent line and a receptacle for insertion of a pump nozzle connected therein is improved by constructing the receptacle so as to at least partially surround a pump nozzle inserted therein in close proximity thereto and by having the receptacle create a hollow space in conjunction with a wall of the filler neck that is closed on a side facing into the fuel tank but has openings on an opposite side communicating outwardly from the tank, the fuel tank vent line terminating in the hollow space. In accordance with the above concept, preferred embodiments of the invention enable air vented by the vent line to pass directly into the filler neck upstream of an outlet of the pump nozzle so that entrainment of fuel particles in air vented therefrom, including associated splattering thereof, is effectively precluded.

8 Claims, 2 Drawing Figures

U.S. Patent    Nov. 17, 1981    4,300,699
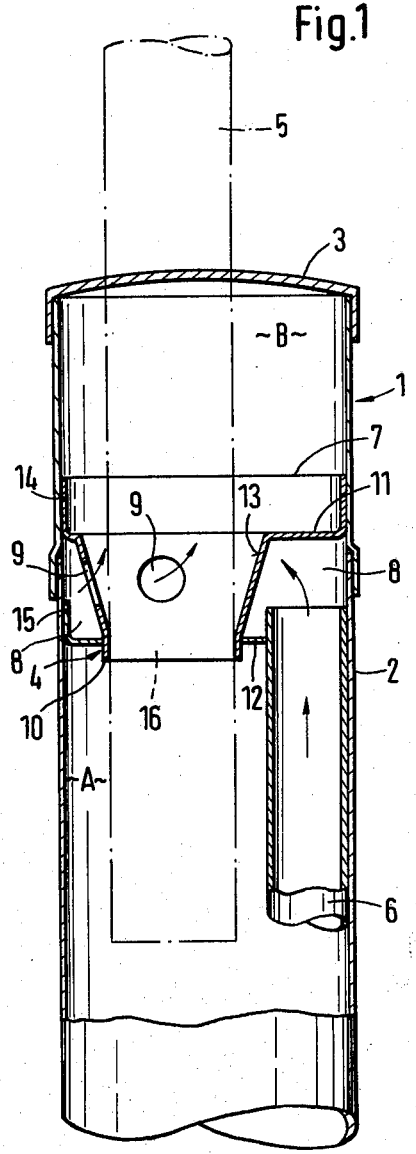
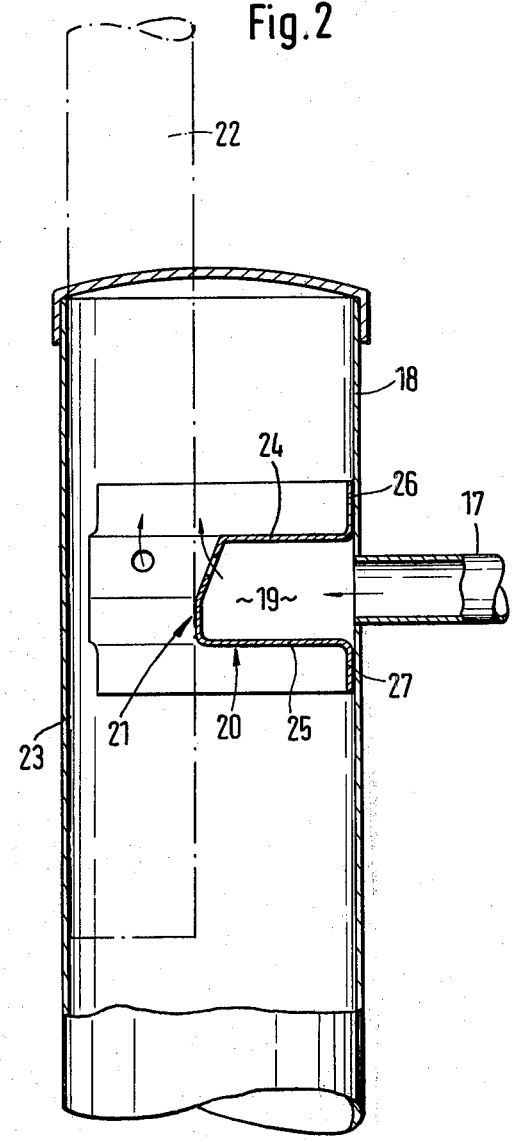

FUEL TANK FOR MOTOR VEHICLES

BACKGROUND AND SUMMARY OF THE INVENTION

The invention relates to a fuel tank for motor vehicles, with a filler neck, on which a vent line and a receptacle for a pump nozzle are provided.

In a known fuel tank of the species cited hereinabove (German Offenlegungsschrift No. 2,208,189), a receptacle for a pump nozzle is located upstream of the opening of a vent tube, viewed in the direction of reverse flow. It has been found in practice that this arrangement does not sufficiently ensure that an individual filling the vehicle with fuel will not be spattered with fuel. The volume at which the fuel is introduced into the tank (60 L/minute) produces compression, especially just before the pump nozzle shuts off, in other words, a reverse flow of the air in the tank through the vent line. This medium, flowing in the reverse direction, entrains fuel particles, even carrying them past the receptacle, producing the above-mentioned nuisance.

It is thus an object of the invention to make provisions in the filler neck of a fuel tank which will avoid the above-mentioned disadvantages.

This object is achieved according to a preferred embodiment of the invention by virtue of the fact that a receptacle surrounds the pump nozzle, at least for a portion of its length, and nearly comes in contact with it, the receptacle being associated with an insert which delimits a space on all sides and is closed on the side facing the tank, but has openings on the opposite side, and by the fact that a vent line terminates in the space. It is advantageous in this connection if the receptacle surrounds the pump nozzle with a collar, and extends between an outer bulkhead and an inner bulkhead of the insert. The receptacle has a conical part between the collar and the outer bulkhead. The openings are provided in the conical part of the receptacle. The vent line runs in a known fashion inside the filler neck and is connected to the inner bulkhead. It is also possible, in accordance with a preferred embodiment, to connect a vent line, which is known of itself and runs outside the filler neck, in an area between the bulkheads, against this filler neck. The outer bulkhead and the receptacle are connected integrally with one another whereby the collar projects into an opening of the separate, inner bulkhead. It is also possible, in accordance with a further embodiment, to connect the bulkheads of the insert integrally with one another and to mount them to the tube segment by flanges.

Among particular advantages achieved with the invention is the fact that, by disposing the vent line in the chamber which is cut off from the tank, entrainment of fuel particles is ruled out for all practical purposes so that the person filling the tank with fuel is protected from a spray of fuel. This is especially important in view of the trend for drivers wearing ordinary clothing to fill their vehicles themselves with fuel. A further advantage is that the parts of the insert are simple in design and can easily be inserted in the filler neck.

These and further objects, features and advantages of the present invention will become more obvious from the following description when taken in connection with the accompanying drawings which show, for purposes of illustration only, several embodiments in accordance with the present invention.

BRIEF DESCRIPTION OF THE DRAWINGS

FIG. 1 is a lengthwise section through a filler neck of a fuel tank; and

FIG. 2 is a view corresponding to FIG. 1, showing another embodiment.

DETAILED DESCRIPTION OF THE PREFERRED EMBODIMENTS

Only the filler neck 1 of the fuel tank is shown (FIG. 1). This neck is formed by a tube section 2 and a cap 3. A receptacle 4 for a pump nozzle 5 and a vent line 6 are located inside tube section 2. Vent line 6 is connected to the highest point in the tank, which is not shown, and receptacle 4 is located within the filler neck at a position which ensures that all appropriate pump nozzles (e.g. in the U.S. leaded, diesel or unleaded fuel nozzles) will extend therethrough so that their outlet is downstream of the receptacle.

Receptacle 4 is associated with an insert 7 which delimits a space 8 on all sides in connection with the tube section. Space 8 is closed on side A which faces the tank, but is provided with openings 9 on side B which faces cap 3. In addition, vent line 6 connects to space 8.

Receptacle 4 is sized to fit around a pump nozzle 5, of the type (e.g. leaded, unleaded or diesel) required for use with a particular vehicle, with a collar 10, and comes nearly in contact with it, said receptacle further extending between an outer bulkhead 11 and an inner bulkhead 12, whereby space 8 is made annular.

In order to ensure reliable introduction of pump nozzle 5 into receptacle 4, the latter is provided with a conically tapering part 13 between collar 10 and outer bulkhead 12. Openings 9 are provided in this conical area 13.

Bulkhead 11 and receptacle 4 are connected integrally with one another and fastened by a flange 14 to tube section 2. On the other hand, bulkhead 12 is attached to tube section 2 by a flange 15, whereby bulkhead 12 comprises an opening 16 which surrounds collar 10 and fits closely against it.

As soon as air flows through vent line 6, the air enters space 8 and emerges through openings 9, as shown by the arrow, without being able to entrain any fuel particles.

In the embodiment shown in FIG. 2, vent line 17 runs into a space 19 from the outside of the tube section 18. Space 19 is delimited by an insert 20 whose receptacle 21 is so located that pump nozzle 22 runs along wall 23 of tube section 18. Bulkheads 24 and 25 of insert 20 are connected integrally with one another and are connected to tube section 18 by flanges 26 and 27.

Like the receptacle 4 of the embodiment of FIG. 1, the receptacle 21 is provided with a tapering part 29 to ensure reliable insertion of the pump nozzle. Also, similar to the FIG. 1 embodiment, the FIG. 2 arrangement enables air to be vented from the fuel tank without causing spatting of the fuel out of the filler neck, air vented from the top of the fuel tank passing up vent line 17, through chamber 19 and openings 30 into the filler neck 18 at a point upstream of the nozzle outlet inserted through receptacle 21 in filler neck 18.

While I have shown and described several embodiments in accordance with the present invention, it is understood that the same is not limited thereto but is susceptible to numerous changes and modifications as known to those skilled in the art and I therefore do not wish to be limited to the details shown and described herein but intend to cover all such changes and modifications as are encompassed by the scope of the appended claims.

I claim:

1. In a fuel tank for motor vehicles of the type having a filler neck, a fuel tank vent line and a receptacle for insertion of a pump nozzle connected therein, the improvement wherein the receptacle is constructed to at least partially surround a pump nozzle inserted into said filler neck in close proximity thereto, said receptacle comprises an insert which delimits a hollow space between sides of said insert and a wall portion of said filler neck, said hollow space being closed except for openings communicating outwardly from said hollow space in a direction away from said fuel tank and said fuel tank vent line which terminates in said hollow space, whereby air vented by said vent line is directed into said filler neck upstream of an outlet of said pump nozzle inserted into the filler neck.

2. Fuel tank according to claim 1, characterized by the fact that the receptacle surrounds said pump nozzle with a collar and extends between an outer bulkhead and an inner bulkhead of the insert.

3. Fuel tank according to claim 2, characterized by the fact that the receptacle has a conically tapering part between the collar and the outer bulkhead.

4. Fuel tank according to claim 3, characterized by the fact that said openings are provided in said conically tapering part of the receptacle.

5. Fuel tank according to claim 2, characterized by the fact that the vent line runs inside the filler neck and is connected to the inner bulkhead.

6. Fuel tank according to claim 2, characterized by the fact that the vent line runs outside the filler neck and is connected to the filler neck in communication with said hollow space in an area between the bulkheads.

7. Fuel tank according to claim 2, characterized by the fact that the outer bulkhead is integrally connected to said collar, the collar projecting into an opening in the inner bulkhead which is formed of a separate part.

8. Fuel tank according to claim 2, characterized by the fact that the bulkheads are connected integrally with one another through said collar and are mounted on an inner wall section of said filler neck by flanges.

* * * * *